UNITED STATES PATENT OFFICE.

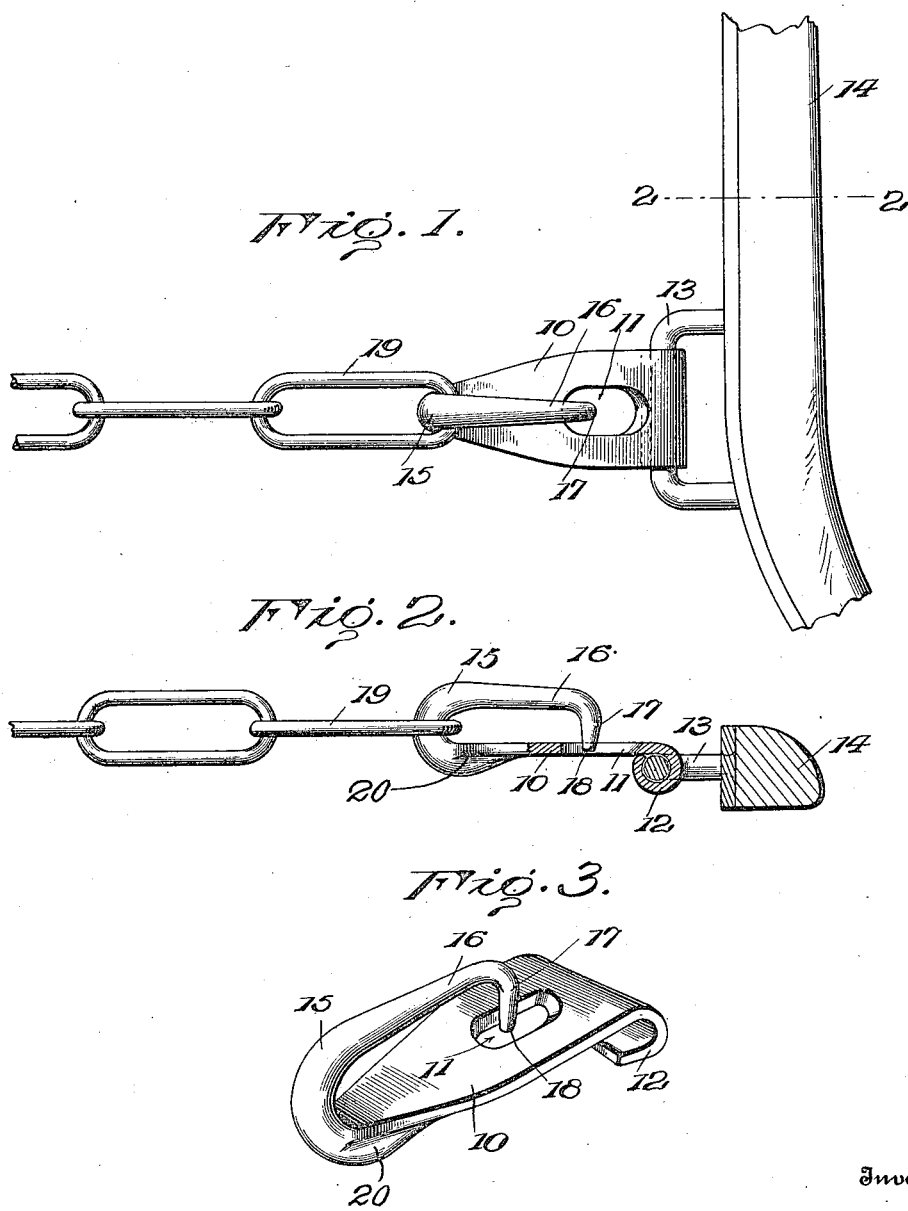

OWEN EARL BRICKEY, OF SANTA MARIA, CALIFORNIA.

TRACE-COUPLING.

1,282,534.

Specification of Letters Patent. Patented Oct. 22, 1918.

Application filed April 9, 1918. Serial No. 227,568.

*To all whom it may concern:*

Be it known that I, OWEN EARL BRICKEY, a citizen of the United States, residing at Santa Maria, in the county of Santa Barbara and State of California, have invented certain new and useful Improvements in Trace-Couplings, of which the following is a specification.

This invention relates to harness attachments commonly known as trace couplings, and has for one of its objects to simplify the construction and increase the efficiency and utility of devices of this character.

Another object of the invention is to produce a device of this character whereby the trace chains may be quickly coupled and uncoupled and which will not become accidentally released, but which may be readily released manually when required.

With these and other objects in view, the invention consists in certain novel features of construction, as hereinafter shown and described and then specifically pointed out in the claim.

The improved device may be employed wherever a chain is to be attached to an object, and it is not desired to limit the invention to any specific use or mechanism. The device is designed more particularly for coupling the trace chains to the hames of heavy draft harness, and for the purpose of illustration is shown thus applied in the drawings.

Figure 1 is a side elevation of a portion of a hame with the improvement applied.

Fig. 2 is a plan view with portions in section on the line 2—2 of Fig. 1.

Fig. 3 is a detached perspective view.

The improved device comprises a body portion 10 having an elongated slot 11 intermediate its ends and initially formed with an open hook being 12 at one end, the hook designed to be engaged around the bar portion 13 of a hame, a portion of which is represented at 14. The hook 12 will be initially formed open and forcibly closed around the bar 13 by a hammer or other suitable implement. The hook 12 is thus of the "cold shut" form.

The body 10 is relatively wide at the hooked end and is reduced toward the opposite end and extended into a relatively heavy hook member 15, the latter being disposed substantially in parallel relation to the body 10 as shown at 16 and the terminal 17 thereof directed toward the body and ending within the slot 11 with its free end spaced slightly from the adjacent line of the body 10. By this means no portion of the terminal 17 extends beyond the face of the body to come in contact with the side of the animal to which the harness is applied. The point of the hook is thus inclosed entirely between the side faces of the body 10, and is thereby prevented from lacerating the body of the horse or scraping or otherwise injuring adjacent portions of the harness. The improved device being alike at both edges may be coupled to either one of the hames, and is therefore interchangeable. The hook 15 at its junction with the reduced end of the body or plate 10 is preferably formed with a thickened portion or enlargement 20 which extends longitudinally of the plate and serves to reinforce and strengthen said plate at its weakest point.

The device is simple in construction, can be inexpensively manufactured by machinery thus avoiding hand labor. The hook 15 is designed to receive a link of the trace chain, portions of which are represented at 19, and the chains may be shortened or lengthened by coupling any one of the links to the hook. The slot 11 is of sufficient width to permit the link which is to be coupled to the hook to be inserted alongside the inwardly directed portion 17 and passed beneath the end 18 either in attaching or detaching the link. Any link of the chain may be coupled to the hook and the surplus links permitted to hang downwardly from the attached link.

Having thus described the invention, what is claimed as new is:

A device of the class described comprising a flat plate having its opposite faces smooth and unobstructed and provided with a longitudinally disposed slot, one end of the plate being bent to form an attaching member and the other end thereof being reduced to form a contracted portion terminating in a link engaging hook the intermediate portion of which is disposed parallel with the adjacent face of the plate and the terminal thereof bent at substantially right angles to said plate and extended within the slot with its free end within the lines of the opposite faces of the plate, there being an enlargement formed on the hook at its junction with the reduced end of the plate and extending longitudinally of said plate and disposed within the lines of the attaching member.

In testimony whereof I affix my signature.

OWEN EARL BRICKEY. [L. S.]

Copies of this patent may be obtained for five cents each, by addressing the "Commissioner of Patents, Washington, D. C."